United States Patent [19]

Osthues

[11] 3,874,631

[45] Apr. 1, 1975

[54] ADJUSTABLE, CORROSION-RESISTANT, BUTTERFLY VALVE

[75] Inventor: Robert H. Osthues, West Boylston, Mass.

[73] Assignee: Worcester Controls Corporation, West Boylston, Mass.

[22] Filed: Feb. 15, 1974

[21] Appl. No.: 443,049

[52] U.S. Cl. ............... 251/148, 251/170, 251/306, 285/367
[51] Int. Cl. .......................................... F16k 1/226
[58] Field of Search .......... 251/148, 150, 151, 152, 251/170, 171, 192, 306, 307; 137/375; 285/367

[56] References Cited
UNITED STATES PATENTS

| | | | |
|---|---|---|---|
| 2,974,921 | 3/1961 | Kaswan | 251/306 X |
| 3,006,598 | 10/1961 | Carr et al. | 251/171 |
| 3,369,791 | 2/1968 | Snodgrass et al. | 251/148 X |
| 3,376,014 | 4/1968 | Buckley et al. | 137/375 X |
| 3,630,552 | 12/1971 | Byron | 285/367 X |
| 3,762,684 | 10/1973 | Stein | 251/148 |

*Primary Examiner*—William R. Cline
*Attorney, Agent, or Firm*—Elliott I. Pollock

[57] ABSTRACT

An adjustable butterfly valve of known type is improved by the addition of a plastic, e.g., Teflon, liner disposed between the valve disc and elastomeric seat to isolate corrosive fluids in the valve from the seat. The valve comprises a pair of spaced, axially aligned pipe ends having a resilient seat therebetween, and associated with a pair of radially spaced body members bearing on the outer diameter of the seat and having inclined interior surfaces in engagement with complementarily inclined exterior surfaces of the pipe ends to permit radial and axial compressive forces exerted on the seat to be simultaneously adjusted by adjustment of the body members toward and away from one another. An annular plastic liner separate from the seat is disposed around the flow passage through the valve between the inner diameter of the seat and the periphery of the valve disc, and the pipe ends are provided with annular grooves which receive the axially spaced edges of the annular liner. Each pipe end is further provided with an annular flange extending in an axial direction generally parallel to the inner diameter of the liner, with each flange terminating in a sealing lip extending radially toward and into sealing engagement with the inner diameter of the liner. A central portion of the liner protrudes in a radial direction between the lips into sealing engagement with the periphery of the valve disc and with shoulders provided between the disc and its supporting shaft.

10 Claims, 3 Drawing Figures

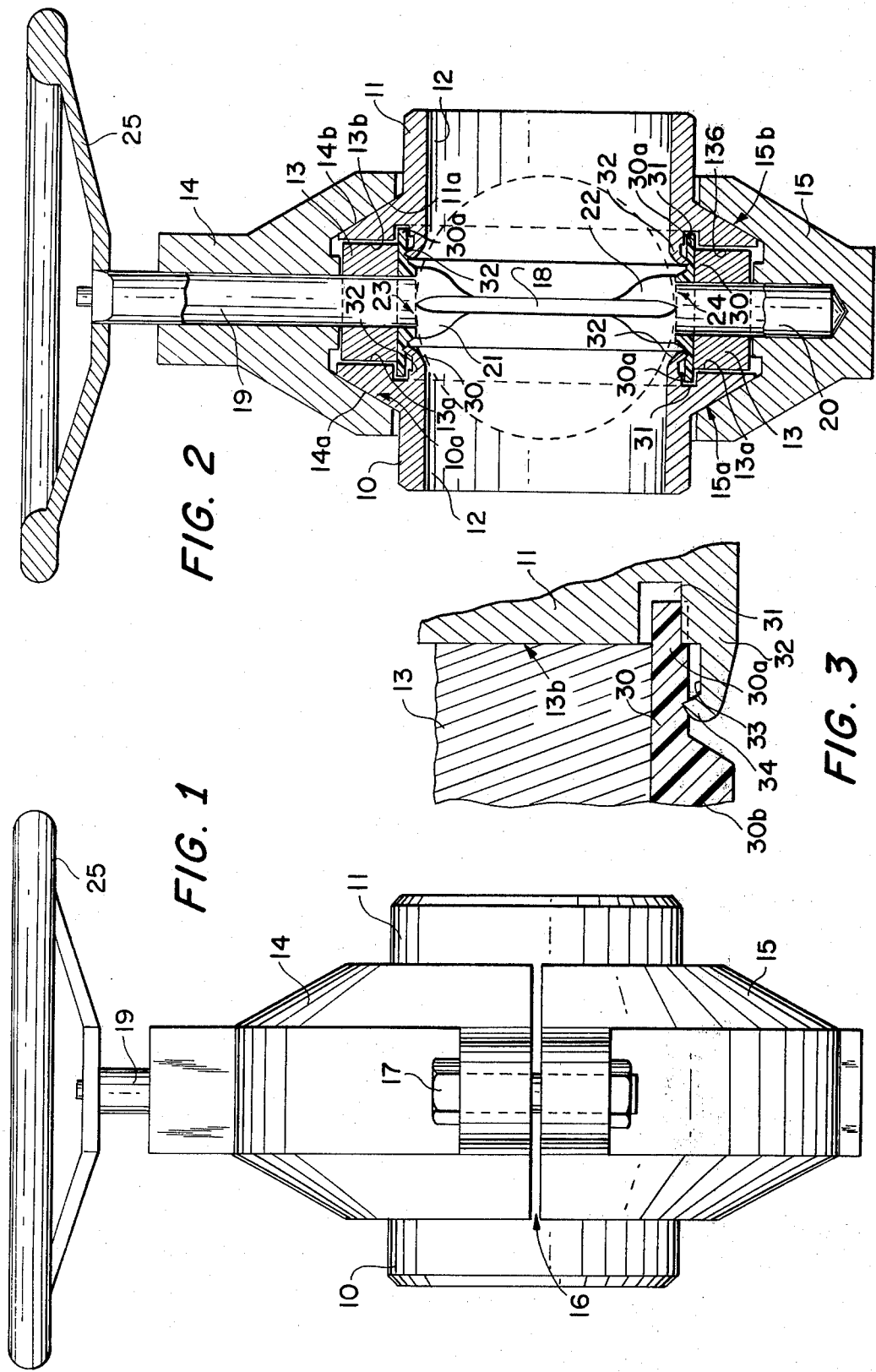

ADJUSTABLE, CORROSION-RESISTANT, BUTTERFLY VALVE

BACKGROUND OF THE INVENTION

The present invention is directed to an improved form of adjustable butterfly valve of the general type disclosed in Snodgrass, et al., U.S. Pat. No. 3,369,791, issued Feb. 29, 1968, for "Disc Type Flow Control Valve." The Snodgrass patent is concerned with a butterfly valve comprising a pair of pipe ends disposed in axially aligned, spaced relation to one another and associated with a pair of radially spaced, substantially hemispherical body members disposed in surrounding relation thereto, with the body members and pipe ends having cooperating inclined surfaces in engagement with one another and so arranged that adjustment of the body members toward one another in a radial direction simultaneously effects adjustment of the pipe ends toward one another in an axial direction thereby to permit variation in the radial and axial compressive forces exerted on a resilient seat disposed between said pipe ends and body members respectively. The inner diameter of the seat is in sealing engagement with the outer periphery of a butterfly disc which is adapted to be moved through 90° to selectively open and close the flow passage, and adjustment of the radial and compressive forces exerted on the seat assures that a proper seal can always be achieved notwithstanding possible wear or movement of the component parts of the valve under extended service conditions.

The adjustable valve of the aforementioned Snodgrass patent is so arranged that the inner diameter of the seat is exposed to fluids flowing through the valve. This consideration becomes significant when it is desired to control the flow of corrosive fluids for, in such circumstances, the fluids may, after a comparatively short period of time, deteriorate the seat beyond the adjustment capabilities of the valve. In order to obviate this problem, it is therefore highly desirable to isolate the elastomeric material of the seat from fluids flowing through the valve, by means of a corrosion-resistant barrier interposed therebetween, e.g., a barrier fabricated of a material such as Teflon. The concept of employing a Teflon barrier in a butterfly valve, to achieve corrosion resistance, is in itself known in the art, e.g., see Buckley, et al., U.S. Pat. No. 3,376,014, Snell U.S. Pat. No. 3,241,806, and Broz U.S. Pat. No. 2,863,630. However, these prior arrangements have contemplated that the elastomeric seat in the valve is always disposed at a predetermined, fixed position relative to the valve body and pipe ends, with the Teflon liner configuration being designed on the basis of this premise; and these prior arrangements have accordingly exhibited a number of problems when employed in an arrangement of the type contemplated by the present invention, wherein the valve is designed to permit relative movement of a pair of body members as well as a pair of pipe ends toward and away from one another.

The present invention, recognizing these problems, is accordingly concerned with an improved valve of the Snodgrass type wherein the body members and pipe ends can be adjusted in position relative to one another to adjust the sealing forces exerted by the valve seat, without impairing the corrosion resistance function achieved in the valve by a plastic liner positioned between the valve seat and butterfly disc.

SUMMARY OF THE INVENTION

In accordance with the present invention, each pipe end configuration employed in a valve of the Snodgrass type is modified (a) to provide an annular groove adapted to receive an axial edge of an annular, corrosion resistant, plastic liner fabricated of Teflon or other appropriate nonfrangible plastic material, and disposed between the elastomeric seat and the periphery of the valve disc, and (b) to provide an annular flange extending in a generally axial direction parallel to the inner diameter of the plastic liner and terminating in a radially directed sealing lip which forcibly engages the inner diameter of the liner. By this arrangement, the elastomeric seat forces the plastic, e.g., Teflon, liner into sealing engagement with the sealing lips on the pipe ends respectively, to provide a resilient backing on the liner for sealing purposes for all adjusted positions of the body members and pipe ends.

The Teflon liner is relatively thick, e.g., 0.060 to 0.400 inches, and is made to behave as a resilient valve seat through the action of the elastomeric backing. The layer of Teflon is made to seal radially to extensions of the pipe ends, i.e., the aforementioned annular flanges and associated sealing lips, by providing a radially inward force which seals the Teflon against the pipe end extension. The seal thus provided is made variable by varying the stress on the elastomer, either by employing prestress or by varying the compression of the elastomeric seat as an adjustment after the valve has been installed.

The plastic liner preferably includes relatively narrow marginal portions which are engaged by the sealing lips, and an integral relatively thicker portion which protrudes radially between the lips into engagement with the periphery of the valve disc and into engagement with shoulders provided between the valve disc and its associated supporting shaft. The seal which acts on the shoulders of the disc, where the disc joins its supporting shaft, permits the shaft seal to be accomplished entirely within the inside diameter of the valve itself, thereby improving cleanliness and obviating the need to provide a liner portion which extends up into the elastomeric seat for purposes of extending the shaft sealing area (although the plastic liner material could be extended up the shaft if it is necessary to improve this sealing condition).

The overall arrangement continues to permit the adjustable performance which characterizes a valve of the Snodgrass type, provides, under all adjustment conditions, a positive, leak-proof, seal which prevents leakage through the valve when the valve is closed, and also provides a seal between the interior and the exterior of the valve which exposes only the plastic liner material to media inside the valve itself. In addition, the pipe end and liner configuration employed in the present invention makes the sealing member of the valve relatively insensitive to any motion of the upstream and downstream pipe lines, or to relative motion between the pipe ends of the valve which are normally welded to such pipe lines. The gripping of the plastic liner by the lips on the pipe ends helps to keep the liner in position, and makes the seat and its associated seal insensitive to scuffing motion generated by the disc working against the seat as the valve disc is moved between its opened and closed positions.

BRIEF DESCRIPTION OF THE DRAWINGS

FIG. 1 is a side view of the improved valve of the present invention;

FIG. 2 is a cross-sectional view of the valve shown in FIG. 1; and

FIG. 3 is a detail view showing a modified pipe end and Teflon liner associated with an elastomeric seat in accordance with the present invention.

DESCRIPTION OF THE PREFERRED EMBODIMENT

Referring to the several figures, like numerals of which refer to like parts throughout, it will be seen that the improved valve of the present invention comprises a pair of spaced, axially-aligned pipe ends 10 and 11 which define a flow passage 12 in the axial direction therethrough. An elastomeric, resilient seat 13, of annular configuration, is disposed in surrounding relation to flow passage 12 between pipe ends 10 and 11, with the axially opposed faces 13a, 13b of seat 13 being disposed in facing relation to adjacent radially directed surfaces of the pipe ends 10, 11. Accordingly, if the pipe ends 10, 11 should be moved toward one another, the axial compressive forces exerted on seat 13 between faces 13a, 13b thereof will increase.

The valve further includes a pair of body members 14, 15 which are radially spaced from one another as at 16 (see FIG. 1) and which are interconnected to one another by a pair of diametrically opposed adjustment bolts 17 (only one of which is shown). Upper body member 14 includes a pair of inclined surfaces 14a, 14b which are in engagement with complementarily inclined exterior surfaces 10a, 11a on pipe ends 10 and 11 respectively, and lower body member 15 is similarly provided with a pair of inclined interior surfaces 15a, 15b which engage said complementarily inclined exterior surfaces 10a, 11a of pipe ends 10, 11. By reason of this configuration, if the bolts 17 (FIG. 1) should be tightened to draw body members 14, 15 toward one another, thereby to increase the radially directed compressive forces exerted on the outer diameter of seat 13 by the facing interior surfaces of body members 14, 15, the wedging action achieved by the aforementioned complementarily inclined interior and exterior surfaces will simultaneously draw pipe ends 10, 11 toward one another to increase the axial compressive forces on seat 13. This action, which characterizes the aforementioned Snodgrass patent, accordingly permits adjustment in the sealing forces exerted between seat 13 and the periphery of valve disc 18, regardless of whether said valve is in its closed position (shown in full line in FIG. 2) or in its open position (shown in broken line in FIG. 2).

Valve disc 18 is mounted on a shaft which is journalled in body members 14, 15, said shaft including portions 19, 20 which extend respectively through bores provided in seat 13. The junction between disc 18, and each of shaft portions 19, 20, is bulged outwardly, as at 21 and 22, to provide shoulders 23, 24 which, as will be described hereinafter, cooperate with the plastic liner employed in the improvement of the present invention to provide a shaft seal. The upper portion 19 of the shaft may, moreover, be coupled to an appropriate operator 25, shown in the drawings as a hand wheel for purposes of illustration only, to permit disc 18 to be moved between its open and closed positions.

The structure, and its operation, as thus far described, is essentially the same as that described in Snodgrass, et al., U.S. Pat. No. 3,369,791. The pipe ends 10 and 11 shown in FIGS. 1 and 2 are of the buttweld end type and are adapted to be welded respectively to a pair of pipe lines through which fluid to be controlled is flowing. Alternatively, the butt-weld ends of pipe ends 10, 11 can be replaced by flange ends as shown in the Snodgrass patent to permit the valve to be used as a replacement for existing flange end valves, such as gate valves, already in service.

In order to achieve the corrosion resistance which characterizes the valve of the present invention, without detracting from or impairing the adjustability features of the known Snodgrass valve, the improved valve of the present invention is provided with an annular nonfrangible plastic liner 30 which is separate from elastomeric seat 13, which is fabricated of an appropriate corrosion-resistant material such as Teflon, and which is disposed in surrounding relation to flow passage 12 at a position between the inner diameter of seat 13 and the outer periphery of valve disc 18. The width of liner 30, in an axial direction, is greater than that of seat 13 in said axial direction, whereby liner 30 includes a pair of marginal portions 30a (e.g. see FIG. 3) which extend in an axial direction beyond the opposing axial faces 13a, 13b of seat 13; and each pipe end 10, 11 is provided with an annular groove 31 which receives the marginal edge portions 30a of liner 30. Each pipe end 10, 11 is further modified, in the region adjacent its said groove 31, to provide an extension taking the form of an annular flange 32 extending in an axial direction generally parallel to the inner diameter of liner 30, spaced from said inner liner by a depression or step 33 (see FIG. 3) and terminating in an integral, radially directed lip 34 which is in forcible sealing engagement with the inner diameter of liner 30 at a position spaced inwardly of the opposing axial edges of said liner. Since each pipe end 10, 11 is provided with such a sealing lip, only the region between the sealing lips of the two pipe ends, i.e., the region adjacent the mounting shaft 19, 20 of valve disc 18, is exposed to the fluid flowing through the valve, and this region comprises, in its entirety, a portion of liner 30 backed by resilient seat 13, but completely isolating said seat 13 from the corrosive or other influences of the fluid flowing through the valve.

Liner 30 includes a central portion 30b which can be substantially thicker than, e.g., twice as thick as, the marginal portion 30a of the liner, and said thicker central portion 30b is positioned between the opposing sealing lips 34 provided by pipe ends 10 and 11, and extends in a radial direction between said sealing lips toward disc 18. The various components of the valve are so dimensioned, as best shown in FIG. 2, that the periphery of disc 18 is in sealing engagement with the thicker central portion 30b of liner 30. Diametrically opposed portions of the liner 30, in the thicker central region 30b, are provided with a pair of holes in alignment with the corresponding bores in elastomeric seat 13, through which shaft portions 19, 20 pass, and the shoulders 23, 24 between disc 18 and shaft portions 19, 20 bear upon the thicker central portion 30b of the liner, in sealing engagement therewith adjacent to the shaft holes, to provide a shaft seal between liner 30 and shaft portions 19, 20.

The seal provided between plastic liner 30 and valve disc 18 (and shoulders 23, 24) can be adjusted by varying the pressure exerted by seat 13 upon the outside diameter of liner 30 when the valve is first assembled, or at a later time during service of the valve if there should be any wear or permanent distortion, e.g., due to cold flow of the plastic liner. Any axial motion between pipe ends 10 and 11 at the time of such adjustment, or at any other time during use in service of the valve, is entirely permissible due to the cold flow action of the plastic liner flowing behind the depressions or steps 33 adjacent the pipe end lips 34.

While I have thus described the preferred embodiments of the present invention, many variations will be suggested to those skilled in the art. For example, while the pipe ends 10, 11 have been described as being provided with grooves 31 which receive the marginal edge portions of liner 30, and while such grooves are highly preferred since they permit a Teflon liner of greater width to be employed thereby minimizing possible shearing of the liner due to pressure of the lips and also providing easier assembly without concern about fine tolerances, such pipe end grooves are actually optional. If the axial width of the plastic liner 30 is less than or equal to the axial width of elastomeric body 13, proper sealing will still be effected so long as the spacing between the two sealing lips 34 of pipe ends 10, 11 is less than the axial width of liner 30. Still other variations will be apparent to those skilled in the art, and it must therefore be understood that the foregoing description is intended to be illustrative only and not limitative of the present invention.

Having thus described my invention, I claim:

1. In a butterfly valve of the type comprising a pair of pipe ends disposed in spaced axially aligned relation to one another to define a flow passage therethrough, a valve disc mounted for rotary movement between said pipe ends for opening and closing said passage, said disc being mounted on a shaft journaled at its opposing ends in a pair of body members which are disposed in radially spaced relation to one another about said flow passage, each of said body members including inclined interior surfaces in engagement with complementarily inclined exterior surfaces on said pipe ends to complete said flow passage and to permit relative movement between said body members and pipe ends, a resilient annular seat for said disc, said seat having its outer diameter in engagement with said pair of body members and having its axially opposed faces in engagement with said pair of pipe ends respectively, and adjustment means between said body members for selectively moving said body members toward and away from one another to control the radial compressive forces exerted on said seat while, through the agency of said complementarily inclined interior and exterior surfaces, simultaneously moving said pair of pipe ends toward and away from one another to control the axial compressive forces exerted on said seat, the improvement comprising an annular liner of plastic material separate from said seat and disposed about said flow passage between said pipe ends, the outer diameter of said annular liner being in engagement with the inner diameter of said seat and the inner diameter of said annular liner being in engagement with the outer diameter of said disc, each of said pipe ends including an annular flange extending in an axial direction generally parallel to the inner diameter of said liner, each said flange terminating respectively in a sealing lip directed radially toward said seat and in forcible sealing engagement with the inner diameter of said liner at a position displaced from the axial edges of said liner.

2. The structure of claim 1 wherein said liner has a width, in the axial direction of said valve, greater than the width of said resilient seat in said axial direction.

3. The structure of claim 2 wherein each of said pipe ends defines an annular groove concentric with said annular flange, the axial edges of said liner being located within the annular grooves in said pipe ends respectively.

4. The structure of claim 3 wherein the dimensions of each annular groove are greater than the dimensions of the axial edge of said liner located therein.

5. The structure of claim 1 wherein said seat is fabricated of an elastomeric material, said liner being fabricated of Teflon.

6. The structure of claim 1 wherein said liner includes a pair of diametrically opposed holes through which spaced portions of said shaft extend, said disc including a pair of diametrically opposed shoulders at the periphery of said disc adjacent said shaft portions respectively, said shoulders being in pressure engagement with diametrically opposed portions of the inner diameter of said liner to provide a shaft seal.

7. The structure of claim 1 wherein said annular liner comprises a comparatively thicker central portion bounded by a pair of comparatively thinner marginal portions, said thicker central portions extending in a radial direction toward and into engagement with the periphery of said disc.

8. The structure of claim 7 wherein the thickness of said central liner portion is substantially twice that of said thinner marginal portions in a radial direction.

9. The structure of claim 8 wherein said central and marginal portions of said liner comprise integral portions of a Teflon annulus.

10. The structure of claim 9 wherein said sealing lips are in engagement with the marginal portions of said liner, said thicker central portion extending radially toward said disc between said sealing lips, each of said annular flanges including a depression adjacent its said lip for spacing said flange from the inner diameter of its associated marginal portion to permit cold flow of said liner in the region of said depression.

* * * * *